United States Patent [19]

Yashima et al.

[11] Patent Number: 4,570,078
[45] Date of Patent: Feb. 11, 1986

[54] SWITCH ASSEMBLY FOR A MOTOR VEHICLE

[75] Inventors: Michio Yashima, Kawagoe; Shigeru Iwai, Tokyo; Masashi Hirose, Wako, all of Japan

[73] Assignee: Honda Giken Kogyo Kabushiki Kaisha, Tokyo, Japan

[21] Appl. No.: 498,525

[22] Filed: May 26, 1983

[30] Foreign Application Priority Data

| May 27, 1982 | [JP] | Japan | 57-78117[U] |
| Jun. 9, 1982 | [JP] | Japan | 57-85639[U] |
| Jun. 22, 1982 | [JP] | Japan | 57-93268[U] |
| Nov. 22, 1982 | [JP] | Japan | 57-204960 |
| Jan. 20, 1983 | [JP] | Japan | 58-7835 |

[51] Int. Cl.$^4$ .............................................. H02G 3/00
[52] U.S. Cl. .................................. 307/10 R; 200/61.85; 200/50 C; 180/272
[58] Field of Search ............... 200/5 E, 5 EA, 5 EB, 200/61.54, 61.57, 61.85, 157, 18, 50 R, 50 C, 330, 334, 335, 318, 322, 321; 123/198; 307/10 R, 326; 180/272

[56] References Cited

U.S. PATENT DOCUMENTS

| 3,705,280 | 12/1972 | Harms | 200/50 C |
| 3,789,169 | 1/1974 | Yazvac | 200/50 C |
| 4,213,513 | 7/1980 | Beck | 180/272 |
| 4,297,540 | 10/1981 | Tsutsui et al. | 200/5 E X |
| 4,297,541 | 10/1981 | Niinuma | 200/5 E |
| 4,369,342 | 1/1983 | Suzuki | 200/5 E |
| 4,455,463 | 6/1984 | Rohl | 200/61.85 |

Primary Examiner—G. P. Tolin
Attorney, Agent, or Firm—Birch, Stewart, Kolasch & Birch

[57] ABSTRACT

A switch assembly for an electric system for a motor vehicle such as a motorcycle including an ignition circuit and a starting motor circuit. A first switching member is disposed in the ignition circuit for controlling an operation of a ignition system. A second switching member is disposed in the starting motor circuit, for controlling a current for a starting motor. An interrelating member is provided between the first and second switching members so that the first switching member is necessarily switched to a switch position for actuating the ignition system when the second switching member is operated to actuate the starting motor.

14 Claims, 19 Drawing Figures

SWITCH ASSEMBLY FOR A MOTOR VEHICLE

BACKGROUND OF THE INVENTION

1. Field of the Invention

The present invention relates to a switch assembly for an electric system of a motor vehicle and more specifically to a switch assembly for controlling an ignition system and a starting motor of a motor vehicle.

2. Description of Background Information

In an electric system for a motor vehicle such as a motorcycle, it is usual to provide an auxiliary switch such as a switch designated as an engine stop switch, a kill switch, an ignition switch or an ignition kill switch (that will be referred to as an engine stop switch in the specification), in an electric connection of the ignition system for the purpose of ceasing the operation of the ignition system. The engine stop switch is, for example, connected in series with a main switch, and has a RUN position in which the ignition system is made operative and an OFF position in which the ignition system is disabled so that the operation of the engine is stopped.

However, in operation, if the engine stop switch remains in the OFF position when the starting motor switch is operated to start the engine, it is not possible to initiate the engine operation because the ignition circuit is disabled by means of the engine stop switch. Further, it was often the case that an individual who is going to drive the motorcycle (referred to as a driver hereinafter) does not recognize that the engine stop switch is in the off position and consequently the starting motor is operated for an unduly long time without succeeding in starting the engine.

SUMMARY OF THE INVENTION

An object of the present invention is therefore to provide a switch assembly for an electric system of a motor vehicle which can eliminate a chance in which the engine stop switch is unintentionally switched to the off position during the engine starting operation.

According to the present invention, a switch assembly for an electric system for a motor vehicle including an ignition circuit and a starting motor circuit, comprises a first switch means disposed in the ignition circuit for controlling an operation of an ignition system, a second switch means disposed in the starting motor circuit, for controlling a current of a starting motor, and an interrelating means for providing an interrelation between the first and second switch means so that the first switch means is necessarily switched to a position for actuating the ignition system when the second switching means is operated to actuate the starting motor.

According to further aspect of the present invention, a switch assembly comprises a housing means for housing the first and second switching means and the interrelating means, wherein the interrelating means comprises a switch operating member for the first and second switch means, having a first end for actuating the first switch means and a second end for actuating the second switch means, the switch operating member being pivotally supported in the housing means so that the first switching means is actuated when the first end is pressed-in and the second switching means is actuated when the second end is pressed-in.

According to still a further aspect of the invention, the first switching means comprises a first switch element slidably housed in a switch housing and a first switch operating means connected to the first switch element, and the second switching means comprises a second switch element slidably housed in a second switch housing which is placed in parallel to the first switch housing and a second switch operating means connected to the second switch element, and the interrelating means comprises at least a latching member laterally movable with respect to the movement of the first and second switch operating means and contactable with the first switch operating means so as to latch the first switch element in an actuated position.

According to further aspect of the invention, the first switching means comprises a first switch operating member pivotally mounted in a housing member having a movable switch contact on a side wall thereof, and pivotally movable between a normal position and a pressed-in position, and stationary contacts placed on a wall portion of the housing member at a position facing the movable contact when the first switch operating member is in the pressed-in position, and wherein the second switching means comprises a second switch operating member housed in the housing member, carrying a movable contact and movable between a normal position and a pressed-in position, and stationary contacts disposed in the housing member at a position facing the movable contact on the second switch operating member and contactable with the movable contact when the second switch operating member is in the pressed-in position, and the interrelating means comprises an arm portion formed on the first switch operating member and an edge portion formed on the second switch operating member so that the first switch operating member is released from the pressed-in position by a contact between an end of the arm portion of the first switch operating member and the edge portion of the second switch operating member.

According to another aspect of the invention, the first switching means comprises a first switch operating member pivotally mounted in a housing member, carrying a movable contact on a side wall thereof, and pivotally movable between a normal position and a pressed-in position, and stationary contacts disposed on a wall portion of the housing member, at a position facing the movable contact when the first switch operating member is in the pressed-in position, and the second switching means comprises a second switch operating member slidably received in the housing member, having a movable contact, and stationary contacts disposed on a wall portion of the housing member, and the interrelating means comprises a contacting end formed at an end portion of the first switch operating member and a slope portion formed at an end portion of the second switch operating member, and contactable with the contacting end of the first switch operating member when the latter is in the pressed-in position, so that the first switch operating member is moved back to the normal position in accordance with a slide movement of the second switch operating member.

According to further aspect of the invention, a switch assembly for an electric system for a motor vehicle including an ignition circuit and a starting motor circuit, and having a handle bar and a grip carried at an end of the handle bar, comprises a housing mounted on the handle bar, adjacent to the grip, a first switching means disposed in the ignition circuit, having a first switch operating member, and a second switching means disposed in the starting motor circuit, having a second switch operating member, wherein the first and second switch operating members are housed in the housing in such a manner that the first switch operating member is placed at a closer position to the grip than the second switch operating member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following description taken in conjunction with the accompanying drawings which are given by way of illustration only, and thus are not limitative of the present invention, in which like reference numerals indicate like parts or corresponding elements, and in which:

FIG. 7 is a cross sectional plan view similar to FIG. 4, but showing a state in which a switch operating member of an engine stop switch is pressed in;

DETAILED DESCRIPTION OF THE PREFERRED EMBODIMENTS

Figure 1:
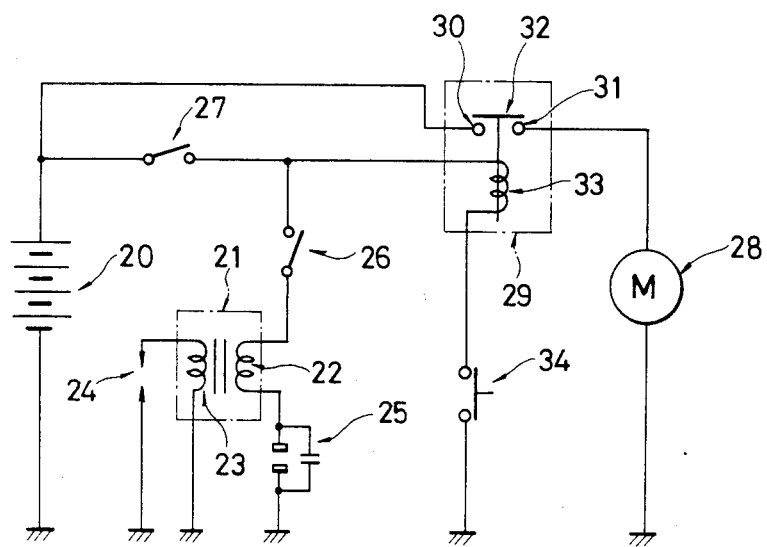
FIG. 1 is a circuit diagram of an electric system of a motorcycle, in which the switch assembly according to the present invention may be utilized.

Reference is first made to FIG. 1 which shows an example of a circuit construction of an electric system of a motorcycle in which the switch assembly according to the present invention will be utilized. As shown, the electric system includes a storage battery 20 as a source of electric energy and an ignition coil 21 having a primary winding 22 and a secondary winding 23. The secondary winding 23 of the ignition coil 21 is connected to a spark plug 24 which is mounted on a cylinder head of an engine. A terminal of the primary winding 22 of the ignition coil 21 is connected to a contact breaker 25 for controlling an electric current through the primary winding 22 of the ignition coil 21 and for determining an ignition timing. The other terminal of the primary winding 22 is connected to an engine stop switch 26 which has a closed position and an open position which are designated as a RUN position and an OFF position respectively. A main switch 27 is also provided in series with the engine stop switch 26 in a power line from the storage battery 20. Thus, an ignition power current from the storage battery 20 is supplied to the ignition coil 21 through closed contacts of the main switch 27 and the engine stop switch 26 during a period of the engine operation.

The electric system of a motorcycle shown in FIG. 1 also includes a starting motor circuit which includes a starting motor 28 and a magnetic switch 29 for controlling a power current of the starting motor 28 from the storage battery 20. The magnetic switch 29 includes a pair of stationary contacts 30 and 31 and a movable contact element (contact disc) 32 which is controlled in accordance with an energization of a driving coil 33. A terminal of the driving coil 33 is connected to a junction between the main switch 27 and the engine stop switch 26. The other terminal of the driving coil 33 is grounded via a normally open starting switch 34. In this arrangement, when the starting switch 34 is actuated to supply a power current from the battery 20 to the driving coil 33 of the magnetic switch 29, the movable contact element 32 of the magnetic switch 29 is pressed against the stationary contacts 30 and 31. And consequently, the starting motor 28 is operated by the power current from the battery to rotate a crankshaft of the engine.

In this arrangement of the electric system, as mentioned before, if the engine stop switch 26 remains open when the main switch 27 is closed and the starting switch 34 is operated to actuate the starting motor 28, it is not possible to start the engine because the ignition circuit is disconnected from the battery 20.

Furthermore, the circuit arrangements of the electric system for motorcycles are not limited to the above explained example, and the engine stop switch might be connected in parallel with the breaker contact so that the operation of the ignition coil is stopped when the engine stop switch is closed (in contrast with the above example). However, it is to be noted that the switch assembly according to the present invention (which will be explained hereinafter) can be utilized in every type of electric system of a motorcycle regardless of the difference between two types of the engine stop switch (one being opened when actuated and the other being closed when actuated).

Figure 2:
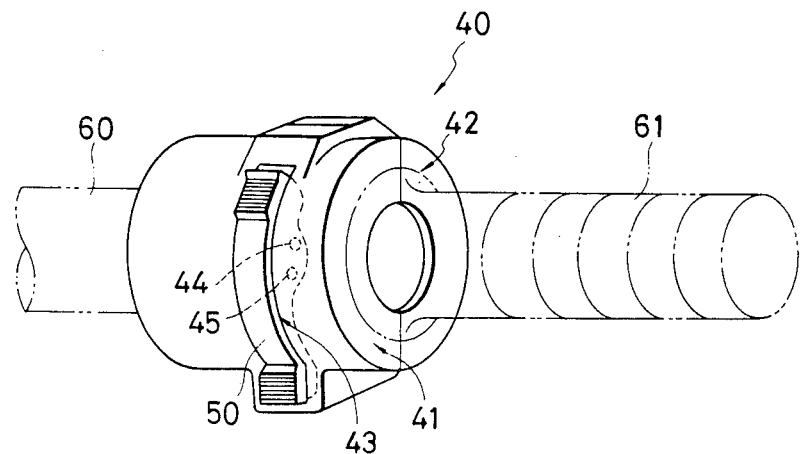
FIG. 2 is a perspective view of a first embodiment of the switch assembly according to the present invention.

Reference is now made to FIG. 2 which illustrates the first embodiment of the switching assembly according to the present invention. As shown, the switching assembly includes a drum shaped housing 40 which consists of a front piece 41 and a back piece 42, each having a semicircular cross section respectively. The front and back pieces 41 and 42 respectively have side walls provided with a semicircular gain so that circular holes are formed at both sides of the housing 40 when the front and back pieces 41 and 42 are fixed with each other. With the circular holes, the housing 40 is securely mounted on a handle bar 60 of a motorcycle, adjacent to a throttle grip 61 which is mounted on a right-hand end of the handle bar 60. As shown in the sectional view of FIG. 3, the housing 40 houses a pair of switches i.e., an engine stop switch 46 and a starting motor switch 47 which are respectively connected to an ignition circuit and to a starting motor circuit of an electric system of the motorcycle such as shown in FIG. 1, and respectively perform the function of the switches 26 and 34. Preferably, a microswitch (snap action switch) is used for the engine stop switch 46 and for the starting motor switch 47 and an output current from the engine stop switch 46 and the starting motor switch 47 is transmitted to the circuit of the electric system via lines 66 and 67 respectively connected thereto. It is to be noted that normally closed switch contacts are used for the engine stop switch 46 and normally open switch contacts are used for the starting motor switch 47. However, a normally open switch contacts may be used as the engine stop switch in accordance with the circuit arrangement of the ignition system.

In order to actuate the engine stop switch 46 and the starting motor switch 47, a switch operating member 50 is provided on the housing 40 so as to swing around a pivot axis provided at a middle position thereof. The switch operating member 50 is generally bowed shape and received in a slot 43 formed in the front piece 41 of the housing 40 in a manner so that a front surface of the switch operating member 50 is substantially on the same level of the surface of the housing 40. Further, the position of the slot 43 is shifted to the side of the throttle grip 61, so that the engine stop switch 46 and the starting motor switch 47 can easily be operated by the thumb of an individual who is driving the motorcycle without need of displacing the other fingers from the throttle grip 61. Also, the switch operating member 50 has a first (upper) end 51 and a second (lower) end 52, respectively having a first push surface and a second push surface with a milled face slightly protruding from the surface level of the housing 40. The switch operating member 50 is also provided with a through hole 53 which is parallel to the front surface, at the middle position thereof. A pivot shaft 44 is fixed to the housing 40 and passes through the through hole 53 so as to support the switch operating member 50 and to allow the swing motion thereof.

The engine stop switch 46 and the starting motor switch 47 are respecitvely disposed behind the first and second ends of the switch operating member 50 so that a back surface of the first end 51 can press an actuating button 48 of the engine stop switch 46 and a back surface of the second end 52 can press an actuating button 49 of the starting motor switch 47. In short, the engine stop switch 46 and starting motor switch 47 are selectively actuated by the swing motion of the switch operating member 50 in accordance with the manual operation of the driver of the motorcycle.

Figure 3:
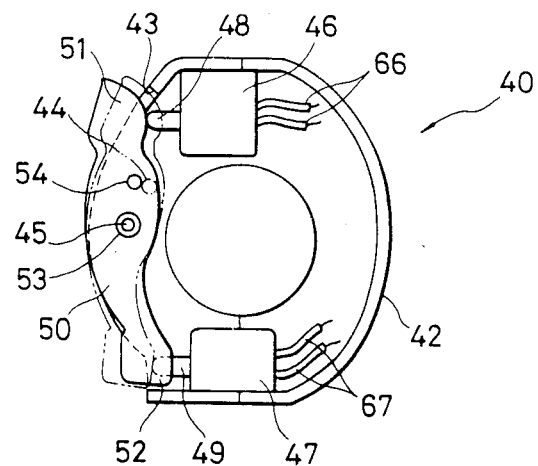
FIG. 3 is a cross sectional view of the switch assembly shown in FIG. 2, taken on a plane perpendicular to an axis of a handle bar on which the switch assembly is mounted.
Figure 4:
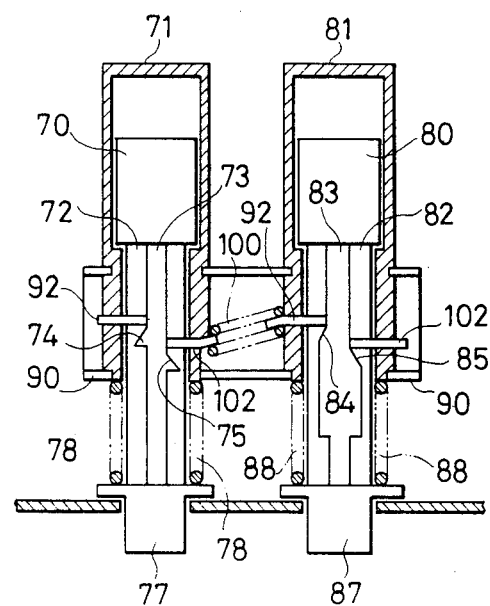
FIG. 4 is a cross sectional plan view of the second embodiment of the switch assembly according to the present invention.
Figure 5:
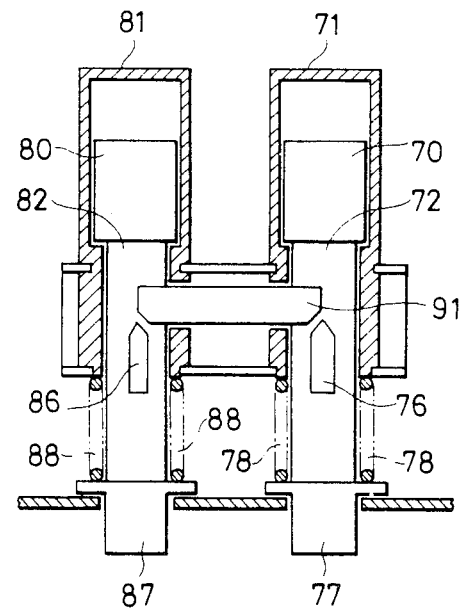
FIG. 5 is a cross sectional bottom plan view of the switch assembly as shown in FIG. 4.
Figure 7:
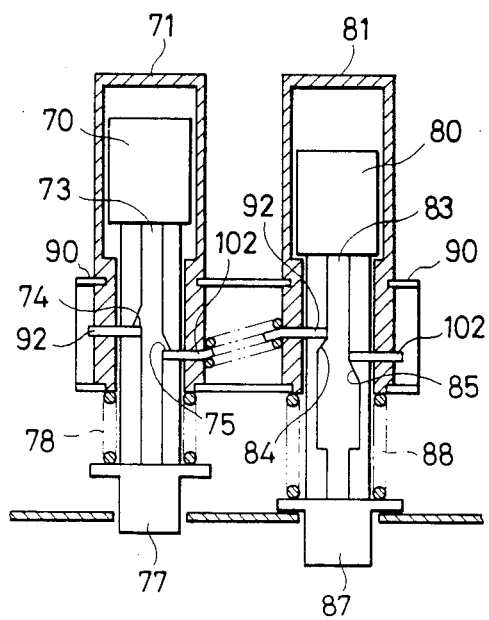

Furthermore, the switch operating member 50 is provided with a protrusion 54 in a side wall thereof at an upper position of the through hole 53 so as to be engaged in a recess 44 formed on the front piece 41 of the housing 40 when the first end 51 of the switch operating member 50 is pressed against the engine stop switch 46 (shown by the partly dashed line of FIG. 3). In other words, the protrusion 54, together with the recess 44, forms a latch means for latching the switch operating member 50 at a position for actuating the engine stop switch 46.

When, on the contrary, the second end 52 of the switch operating member 50 is pressed to actuate the starting motor switch 47, the protrusion 54 is released from the recess 44 and the engine stop switch 46 turns off as shown by the solid line of FIG. 3. Furthermore, when the pressure on the second end 52 is removed, the switch operating member 50 is returned to a neutral position (not shown in FIG. 3) in which both the engine stop switch 46 and the starting motor switch 47 return to the normal position. Moreover, the protrusion 54 of the switch operation member 50 can be replaced by a resilient means consisting of a ball and a spring received in a hole formed on the corresponding position of the switch operating member 50. It will be readily understood that the engine stop switch 46 is automatically returned to the normal position (on position) every time when the starting motor switch 47 is actuated during engine starting operation. Thus, the chance in which the engine stop switch 46 remains actuated during the engine starting operation, which was often the case in the conventional arrangement is eliminated even if the driver forgets to return the switch operating member 50 to the neutral position.

Reference is now made to FIGS. 4 through FIGS. 8 which illustrate the second embodiment of the switch assembly according to the present invention. In the sectional plan view of FIG. 4, the switch assembly of the second embodiment comprises a first switch element 70 for the engine stop switch and a second switch element 80 for the starting motor switch. The first and second switch elements 70 and 80 include switch contacts for controlling electric current, and are respectively slidably housed in housing members 71 and 81. The housing members 71 and 81 are connected with each other by means of a holder member 90 having a generally U-shaped cross section, so that the first and second switch elements 70 and 80 are arranged in parallel relation with each other at a predetermined distance therebetween. The switch elements 70 and 80 are connected, at front ends thereof, to connecting rods 72 and 82 which extend through the housing members 71 and 81. At front ends of the connecting rods 72 and 82, there are provided push buttons 77 and 87 so that the switch elements 70 and 80 can be operated from a front side of the switch assembly. More specifically, either the first switch element 70 and the second switch element 80 can be displaced backward from a released position illustrated in FIG. 4 by means of a mechanism which will be described hereinafter. In order to apply a biasing force for displacing the first and second switch elements 70 and 80 frontward, biasing springs 78 and 88 are provided between a flange portion of the push buttons 77 and 87 and a front edge of the housing members 71 and 81 respectively. The connecting rods 72 and 82 are further provided with elongated protruding portions 73 and 83 respectively on the top face thereof. The protruding portion 73 has a first cam projection 74 and a second cam projection 75 on each of side walls at predetermined positions thereof. Similarly, the protruding portion 83 has a first slope 84 and a second slope 85 on each of side walls at predetermined positions corresponding to the positions of the cam projections 74 and 75 of the first connecting rod 72. Furthermore, as shown in the bottom view of FIG. 5, the connecting rods 72 and 82 are provided with protrusions 76 and 86 on the bottom face thereof. Rear ends of the protrusions 76 and 86 are formed into a wedge shape and a plate 91 is slidably disposed between the rear ends of the protrusions 76 and 86. The plate 91 is slidable along an axis perpendicular to an axis of the slide movement of the connecting rod 72 or 82 and is also provided with wedge portions at left and right ends thereof so as to be contactable with the wedge portions of the protrusions 76 and 86. With this arrangement, the first and second switch elements are prevented from being actuated at the same time.

Figure 6:
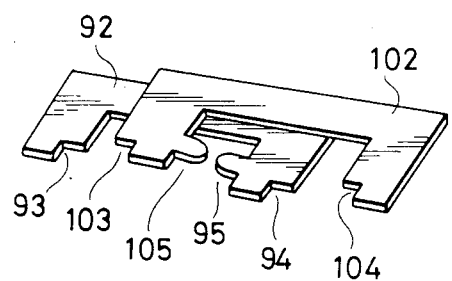
FIG. 6 is a perspective view of a connecting member of the switch assembly shown in FIG. 4.

Further, the movement of the connecting rods 72 and 82 are interrelated by means of a pair of latching plates 92 and 102 which have a configuration the same as each other. As shown in FIG. 6, the latching plates 92 and 102 have a generally U-shaped configuration and are respectively provided with a pair of gains 93 and 94, 103 and 104 at the bottom ends thereof. Further, the latching plates 92 and 102 are slidably received in guide grooves formed on the housing members 71 and 81 at a position adjacent to the front ends thereof in a manner that the direction of the slide movement thereof is perpendicular to the direction of the movement of the connecting rods 72 and 82.

When the latching plates 92 and 102 are mounted in the guide grooves of the housing members 71 and 81, the gains 93 and 103, 94 and 104 will be placed just over the left and right side edges of the connecting rods 72 and 82 so that the portions of the latching plates 92 and 102 which are just above the gains 93 and 103, 94 and 104 can be engaged with the cam projections 74 and 75 of the connecting rod 72, and contact with the slopes 84 and 85 of the connecting rod 82 respectively. Furthermore, a compression spring 100 is provided between a projection 95 formed at an opposite side of the gain 94 of the latching plate 92 and a projection 105 formed at an opposite side of the gain 103 of the latching plate 102. With the provision of this compression spring 100, the latching plates 92 and 102 are applied with a biasing force to press the gains 93 and 103, 94 and 104 against the edges of the connecting rods 72 and 82.

The operation of this latching mechanism will be explained hereinafter. When the push button 77 is pressed to actuate the engine stop switch, the latching plates 92 and 102 are respectively displaced leftward and rightward, against the resilient force of the compression spring 100 due to the backward movement of the cam projections 74 and 75 in accordance with the movement of the first switch element 70 and the connecting rod 72 in the housing member 71. When the cam projections 74 and 75 have moved completely behind the latching plates 92 and 102, the latching plates 92 and 102 will return to the initial position to latch the cam projections 74 and 75 in accordance with the resilient force of the compression spring 100 as shown in FIG. 6. In this state, the connecting rod 72 and the first switch element 71 is held in an actuated position against the resilient force of the biasing spring 78. The first switch element 70 for the engine stop switch is thus held actuated once it is operated by the driver of the motorcycle.

When, on the other hand, the push button 87 is pressed to actuate the second switch element 80 for the starting motor switch from a state in which the first switch element 70 is actuated, the latching plates 92 and 102 will be displaced leftward and rightward respectively, due to the backward movement of the slopes 84 and 85 in accordance with the backward movement of the connecting rod 82 and the second switch element 80 in the housing member 81. By this movement of the latching plates 92 and 102, the cam projections 74 and 75 of the connecting rod 72 are released from the portions of the latching plates 92 and 102 just above the gains 93 and 103 so that the connecting rod 72 and the first switching element 70 will return to the initial position in accordance with the resilient force of the biasing spring 78. Further, the connecting rod 82 and the second switch element 80 will return to the initial position in accordance with the resilient force of the biasing spring 88 when the pressure on the push button 87 is removed. In this way, the engine stop switch is released before the operation of the starting motor.

Figure 8:
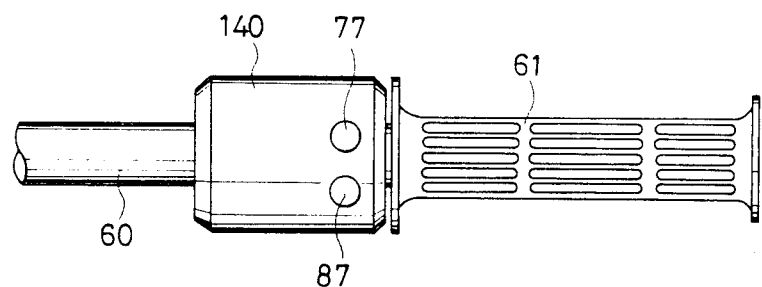
FIG. 8 is a front view of the second embodiment of the switch assembly housed in a casing mounted on a handle bar of a motorcycle.

In addition, the switch assembly shown in FIG. 4 through FIG. 7 is preferably housed in a housing 140 mounted on a handle bar 60 adjacent to a throttle grip 61 as shown in FIG. 8.

Figure 9:
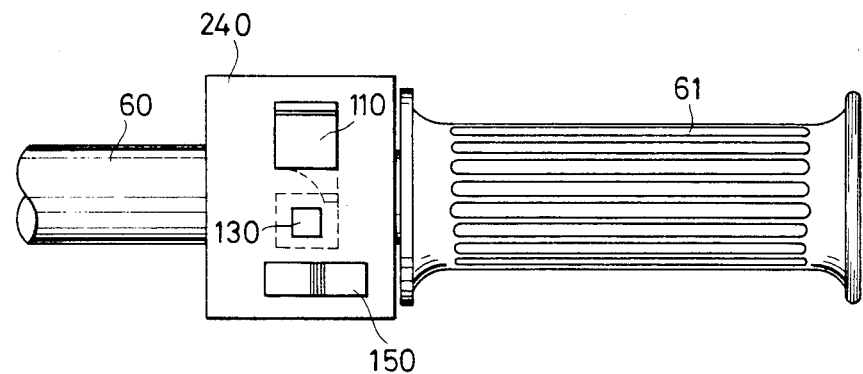
FIG. 9 is a front view of a third embodiment of the switch assembly according to the present invention.
Figure 10:
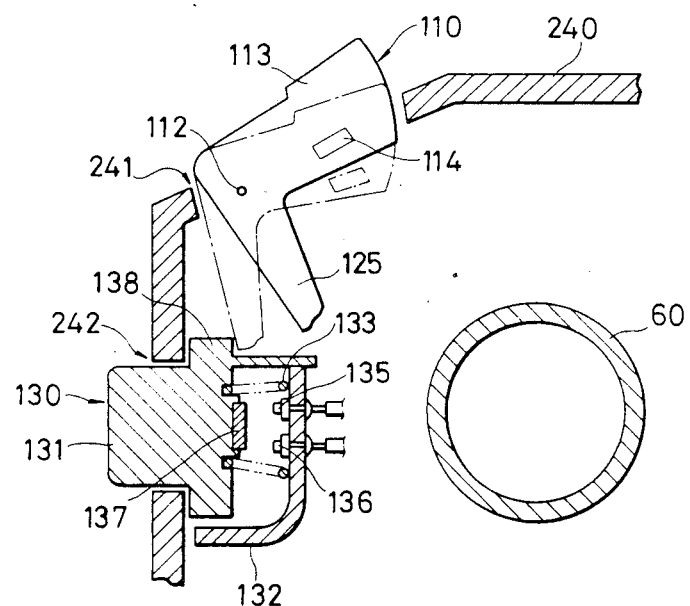
FIG. 10 is a cross sectional view of the switch assembly shown in FIG. 9, taken on a plane perpendicular to a longitudinal axis of the handle bar.

Referring now to FIG. 9 through FIG. 12, a third embodiment of the switch assembly according to the present invention will be explained. In FIG. 9, a housing 240 mounted on a handle bar 60 adjacent to a throttle grip includes a first switch operating member 110 for an engine stop switch and a second switch operating member 130 for a starting motor switch and a third switch operating member 150 for a lighting switch. As shown in FIG. 10, the first switch operating member 110 is housed in a switch housing 111 and held by a pivot shaft 112 which is supported by the switch housing 111. The switch housing 111 is mounted in the housing 240 in a manner so that the direction of the pivot shaft 112 is parallel to a longitudinal axis of the handle bar 60. The first switch operating member 110 is thus rotatable about the pivot shaft 112 and a first lever arm portion 113 thereof is placed in an opening 241 formed in an upper portion of the housing 240 so that an outer surface of the first lever arm portion 113 can be pressed by the driver to actuate the engine stop switch. As for the second switch operating member 130, a head portion 131 thereof is placed in an opening 242 also formed in the housing just below the first opening 141 so as to be slidably moved by pressing the head portion 131 for actuating the starting motor switch. The lighting switch which is operable by means of the third switch operating member 150 is also disposed in the housing 240, however, the explanation thereof is omitted because there is not any particular relationship between the operation of the lighting switch and the operation of the engine stop switch or the starting motor switch.

Figure 11:
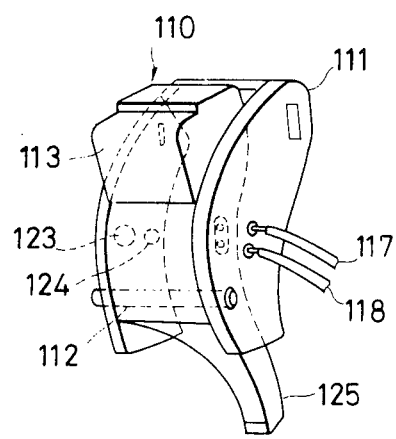
FIG. 11 is a perspective view of a switch element for the engine stop switch used in the switch assembly shown in FIG. 9.
Figure 12:
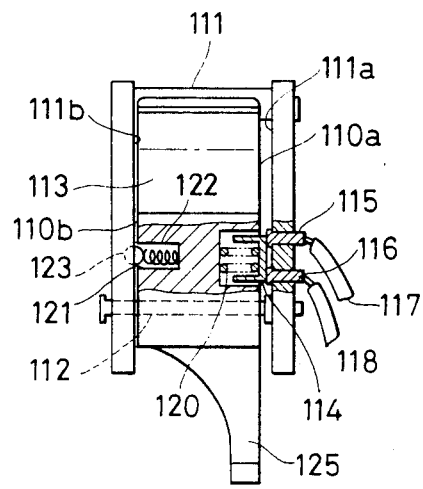
FIG. 12 is a partly sectional front view of the switch element shown in FIG. 11.

The engine stop switch consists of a movable switch contact 114 mounted in a side wall of the first switch operating member 110 and a pair of stationary contacts 115 and 116 fixed on an inner side wall 111a of the switch housing member 111. A pair of conductors 117 and 118 are connected to the stationary contacts 114 and 115 to pick up a switched electric current. As shown in FIGS. 11 and 12, both of the stationary contacts 115 and 116 are placed in a position in which the stationary contacts 115 and 116 are contactable with the movable contact 114 on the first switch operating member 110 when the first switch operating member 110 is rotated about the pivot shaft 112 to a pressed-in position. The movable contact 114 is, as shown in FIG. 12, received in a hollow space 119 formed in a side wall 110a of the first switch operating member 110 and applied with a biasing force by means of a spring 120 also housed in the hollow space 119. With this arrangement, a good electric contact is maintained between the movable contact 114 and the stationary contacts 115 and 116. Furthermore, on the other side wall of the first switch operating member 110, there is provided a hollow space 121 for housing a spring 122 and a steel ball 123 which together with a recess 124 formed in the inner side wall 111b of the switch housing 111. The recess 124 is formed at a position on the inner surface of the switch housing 111 which is opposite to the hollow space 121 of the first switch operating member 110 when the first switch operating member is in the pressed-in position so that the steel ball 123 is received in the recess 124 in accordance with the resilient force of the spring 122. Thus, a latching mechanism for holding the first switch operating member 110 in the pressed-in position is formed by the steel ball 123 and the spring housed in the hollow space 121 and the recess 124 formed in the inner wall of of the switch housing 111.

Furthermore, the first switch operating member 110 is provided with a second lever arm portion 125 which extends downward from the first lever arm portion 113 and which is contactable, at a lower extremity thereof, with the second switch operating member 130. The angle between the first lever arm portion 113 and the second lever arm portion 125 is determined arbitrarily in accordance with the arrangement of the engine stop switch and the starting motor switch.

The structure of the starting motor switch will be explained with reference to FIG. 10. As shown by the cross section of FIG. 10, the starting motor switch has a base member 132 supported by the housing 240. The second switch operating member 130 is placed between the base member 132 and the housing 240 and applied with a biasing force of a spring 133 placed therebetween and fixed to a bottom face 134 of the second switch operating member 130. A pair of stationary contacts 135 and 136 are provided at the center position of the base member 132 and a movable contact 137 is also provided at a corresponding central position of the bottom face 134 of the second switch operating member 130. With this arrangement of electric contacts, the electric current flows between the stationary contacts 135 and 136 and the movable contact 137 when the second switch operating member 130 is pressed against the base member 132. Furthermore, the second switch operating member 130 is provided with a flange portion 138 which defines a limit the the movement of the second switch operating member 130 outward with respect to the housing 240. Further, an inner edge of this flange portion 138 in the side of the first switch operating member 110 is contactable with the extremity of the second lever arm portion 125 of the first switch operating member 110 when the latter is displaced to the pressed-in position as shown by the partly dashed line of FIG. 10.

With the provision of the second lever arm portion 125, the first switch operating member 110 will be released from the pressed-in position when the second switch operating member 130 is pushed to actuate the starting motor circuit. Thus, the engine stop switch is automatically released from the actuated position with the operation of the starting motor switch as is the case the the previous embodiments. Furthermore, it is to be noted that the type of the engine stop switch in this embodiment is that wherein the switch contacts are turned on when actuated, therefore, the circuit connection of the engine stop switch in the ignition system of the motorcycle would be different from those of the previous embodiments.

Figure 13:
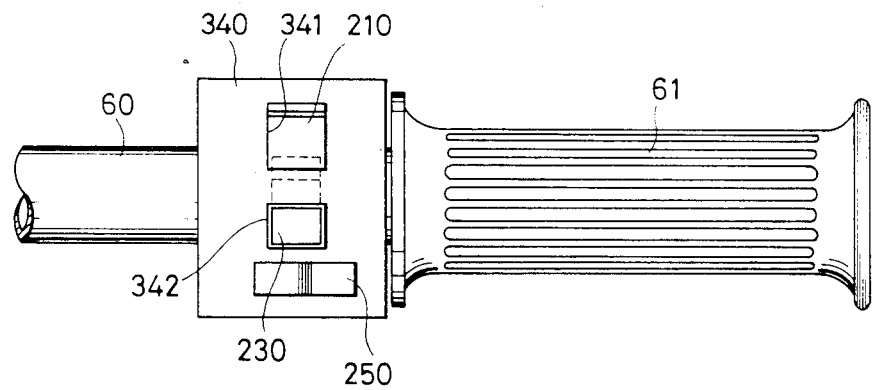
FIG. 13 is a front view of the fourth embodiment of the switch assembly.
Figure 14:
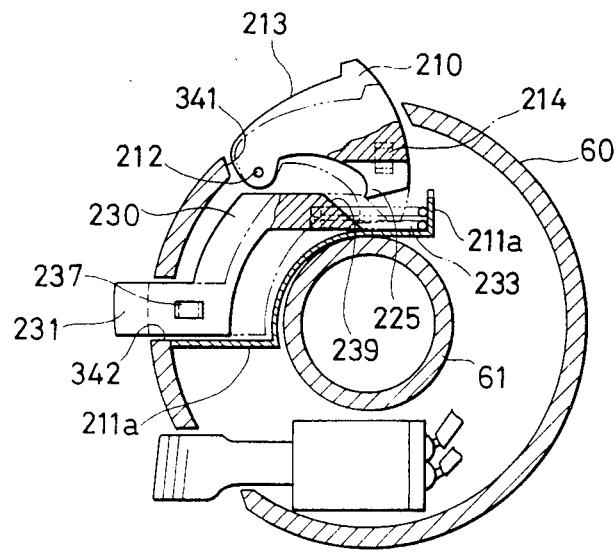
FIG. 14 is a cross section of the switch assembly shown in FIG. 13.
Figure 15:
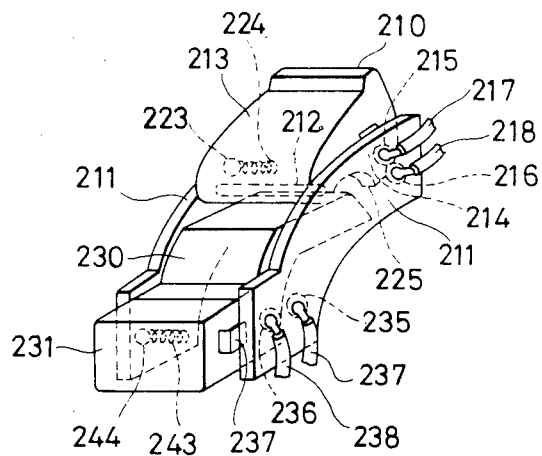
FIG. 15 is a perspective view showing the arrangement of various parts shown in FIG. 14.

Referring now to FIG. 13 through FIG. 15, the fourth embodiment of the switch assembly according to the present invention will be explained. The fourth embodiment has a construction similar to that of the third embodiment described hereinabove, however, it features a second switch operating member having a slope portion for releasing a first switch operating member from an actuated position.

As shown in FIG. 13, the first switch operating member 210 for the engine stop switch and the second switch operating member 230 for the starting motor switch are housed in a housing 340 mounted on the handle bar 60 of the motorcycle adjacent to the throttle grip 61. Also, a third switch operating member 250 for the lighting switch is housed in the housing 340.

As shown in the cross section of FIG. 14, the first switch operating member 210 is supported, at a front end thereof, by means of a pivot shaft 212 which is mounted on a switch housing 211. A top surface 213 of the first switch operating member 210 is positioned in an opening 341 formed at the top portion of the housing 340 so that the top surface 213 can be pressed by the driver for actuating the engine stop switch. A movable switch contact 214 is provided at a side wall of the first switch operating member 210 and a pair of stationary contacts 215 and 216 are mounted on an inner side of a side wall of the switch housing 211 at a position facing the movable contact 214 when the first switch operating member 210 is at the normal position. By this arrangement, the engine stop switch is actuated (turned off) by pressing the first switch operating member 210. In other words, this arrangement of the switch assembly is applicable to the second type of the engine stop switch which is turned off when actuated. Moreover, the first switch operating member is provided with a ball 223 and a spring 224 housed in a recess 222 formed on the side wall thereof. A pair of recesses (not shown) are also provided on an inner side of the side wall of the switch housing 211 so that the first switch operating member 210 is held at the normal position and at the pressed-in position respectively. Furthermore, the spring 224 is used for urging the first switch operating member 210 against the side wall of the switch housing 211 having the stationary contacts 215 and 216 so as to assure a good electric contact between the movable contact 214 and the stationary contacts 215 and 216.

The first switch operating member 210 is also provided, at a bottom position thereof, with a protrusion 225 which can cooperate with the second switch operating member 230.

The second switch operating member 230 has a configuration shown in FIG. 14 and slidable on the bottom plate 211a of the switch housing 211. A front end 231 of the second switch operating member 230 is positioned in an opening 342 formed in a front face of the housing 340 so as to be pressed by the driver for actuating the starter motor. As shown in FIG. 15, a movable contact 237 is fixed on the side wall of the second switch operating member and a pair of stationary contacts 235 and 236 are mounted on the inner side of the side wall of the switch housing 211. A pair of conductors 237 and 238 are connected to the stationary contacts 235 and 236 so that the switched electric current is picked up therethrough. Futhermore, a compression spring 233 is provided between a recess formed at a rear end of the second switch operating member 230 and an upright portion of the bottom plate 211a of the switch housing 211 so as to apply a resilient force against the second switch operating member 230. Also, a ball 244 and a spring 243 is provided at the side wall of the second switch operating member 230 and an elongated recess (not shown) is provided on an inner side of the side wall of the switch housing 211 so as to guide the second switch operating member 230 along a range of the slide movement thereof. Also, the spring 243 is utilized for urging the second switch operating member 230 against the side wall of the switch housing 211 so as to ensure a good electric contact between the movable contact 237 and the stationary contacts 235 and 236.

In order to release the first switch operating member from the pressed-in position, the second switch operating member 230 is provided, at the rear end thereof with a slope surface 239 which is contactable with the protrusion 225 of the first switch operating member 210.

When the first switch operating member 210 is in the pressed-in position as shown by the partly dashed line of FIG. 14, the protrusion 225 thereof contacts with the lower end portion of the slope surface 239 of the second switch operating member. Then, when the second switch operating member 230 is pressed to actuate the starting motor, the protrusion 225 is gradually raised by the rightward movement of the slope surface 239. Thus, the first switch operating member is pushed back to the normal position as shown by the solid line of FIG. 14 and the actuation of the engine stop switch during the engine starting operation is eliminated.

Figure 16:
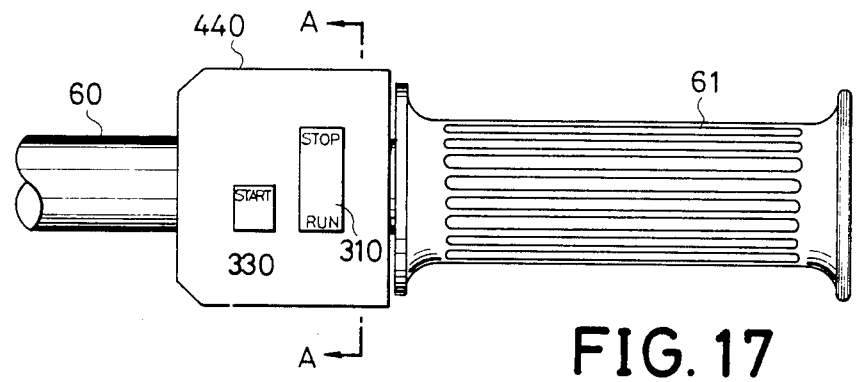
FIG. 16 is a front view of a fifth embodiment of the switch assembly according to the present invention.

Referring to FIG. 16 through FIG. 19, the last embodiment of the switch assembly according to the present invention will be explained. As shown in FIG. 16 a generally box-shaped housing 440 is mounted on the handle bar 60 of the motorcycle at a left-hand side of the throttle grip 61. The housing 440 houses an engine stop switch and a starting motor switch which are operable by means of a first switch operating member 310 and by a second switch operating member 340 respectively. The first and the second switch operating member 310 and 340 are arranged side by side in the housing 440, and the first switch operating member 310 is placed at a right-hand side (the side of the throttle grip 61) of the second switch operating member 330.

The first switch operating member 310 is swingable about an axis which is parallel to a longitudinal axis of the handle bar 60 and an upper portion of the first switch operating member is to be pressed for actuating the engine stop switch. When the upper end of the first switch operating member 310 is pressed, the lower end thereof protrudes from the surface of the housing 440. Therefore, if the driver attempts to press (by using his/her thumb) the second switch operating member for the starting switch when the engine stop switch is actuated, the driver will recognize that the engine stop switch is being operated by the position of the lower end of the first switch operating member. Furthermore, it is very easy to release the engine stop switch by pressing the lower end of the first switch operating member 310 before operating the starting motor switch.

It will be appreciated that the chance in which the engine stop switch is kept actuated during the engine starting operation is eliminated in this embodiment, without using a particular mechanism for providing an interrelation between the first and second switch operating members.

Figure 17:
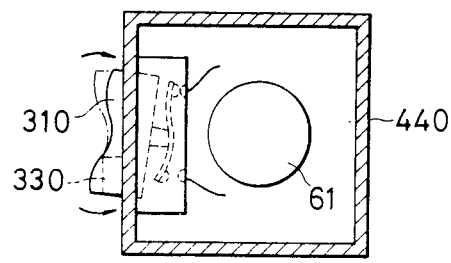
FIG. 17 is a cross sectional view taken along the line A—A of FIG. 16.
Figure 18:
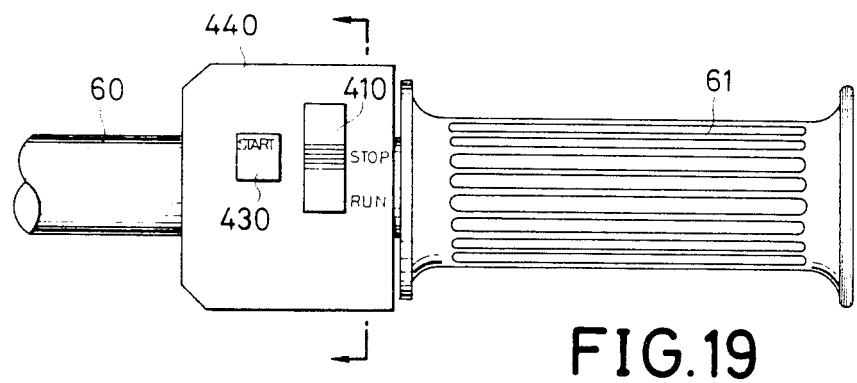
FIG. 18 is a front view of a modification of the switch assembly shown in FIG. 16.
Figure 19:
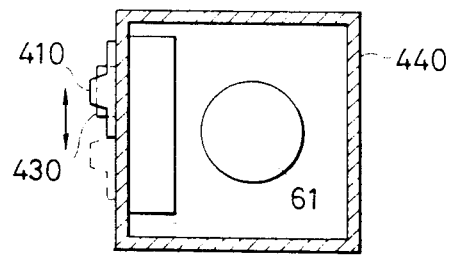
FIG. 19 is a cross sectional view taken along the line B—B of FIG. 18.

Reference is now made to FIGS. 18 and 19, in which a modification of the embodiment shown in FIGS. 16 and 17 is illustrated. In FIG. 18, a first switch operating member 410 and a second switch operating member 430 are provided in the housing 440 in a manner similar to the previous example shown in FIG. 16. This modification features the first switch operating member 410 slidable up and down along an axis perpendicular to the axis of the handle bar 60. The first switch operating member 410 is slidably moved up when actuated (for stopping engine operation). Furthermore, the first switch operating member 410 has a protruding portion on the top surface thereof and the position of the first switch operating member 410 is determined so that the protruding portion thereof is placed just at a right-hand side of the second switch operating member, when actuated. In order to return the engine stop switch to the normal (unactuated) position, the first switch operating member is moved down by a predetermined amount.

With this arrangement, if the engine stop switch is kept actuated during the engine starting operation, the driver will recognize such a condition by means of the position of the protruding portion of the first switch operating member 410. Therefore, the chance in which the engine stop switch is operated during the engine starting operation is also eliminated without using any interrelating mechanisms for the first and second switch operating members in the case of this modification.

It will be appreciated from the foregoing that various embodiments of the switch assembly are provided according to the present invention, and in which the operation of the engine stop switch is controlled, in various manners, with respect to the operation of the starting motor switch. Thus, the possibility that the engine stop switch is kept operated during the engine starting operation is eliminated.

It should be understood that the foregoing description is for illustrative purpose only, and is not intended to limit the scope of the invention. Rather, there are numerous equivalents to the preferred embodiments, and such are intended to be covered by the appended claims.

What is claimed is:

1. A switch assembly for an electric system for a motor vehicle comprising:
   a housing;
   an ignition circuit;
   a starting motor circuit;
   a first switch means operatively connected to said ignition circuit for alternatively enabling and disabling an operation of an ignition system;
   a second switch means operatively connected to said starting motor circuit, for alternatively enabling and disabling a supply of current to a starting motor; and
   said first and second switch means including operating knobs projecting outwardly from said housing, said knob of said first switch means and the knob of the second switch means are arranged up and down in the housing relative to each other with the second switch knob being positioned below the first switch knob;

an interrelating means for providing an interrelation between said first and second switch means so that said first switch means is necessarily switched to a position for actuating said ignition system when said second switching means is operated to actuate said starting motor, said first switch being operatively connected to a latch mechanism which is released when said second switch is operated.

2. A switch assembly as set forth in claim 1, and further comprising a housing means for housing said first and second switching means and said interrelating means, wherein said interrelating means comprises a switch operating member for said first and second switch means, having a first end for actuating said first switch means and a second end for actuating said second switch means, said switch operating member being pivotally supported in said housing means so that said first switching means is actuated when said first end is pressed-in and said second switching means is actuated when said second end is pressed-in.

3. A switch assembly as set forth in claim 2, and further comprising a latching means for latching said switch operating member in a position for actuating said first switch means.

4. A switch assembly as set forth in claim 3, wherein said latching means comprises a protrusion formed on a side wall of said switch operating member and a recess formed on a side wall of said housing member facing said side wall of the switch operating member.

5. A switch assembly as set forth in claim 1, wherein said first switching means comprises a first switch element slidably housed in a switch housing and a first switch operating means connected to said first switch element, and said second switching means comprises a second switch element slidably housed in a second switch housing which is placed in parallel to said first switch housing and a second switch operating means connected to said second switch element, and said interrelating means comprises at least a latching member laterally movable with respect to the movement of the first and and second switch operating means and contactable with said first switch operating means so as to latch said first switch element in an actuated position.

6. A switch assembly as set forth in claim 5, wherein said first switch operating means comprises a first connecting rod, a first push button fixed at an end of said first connecting rod and a first spring placed between said first switch housing and said first push button, and said second switch operating means comprises a second connecting rod, a second push button fixed at an end of said second connecting rod and a second spring placed between said second switch housing and said second push button, and wherein said first connecting rod is provided with at least one latch protrusion which is movable from one side to the other side of said latching member in accordance with the movement of said first connecting rod, and said latch protrusion being latched by an edge of said latching member when said first connecting rod is moved to a position for actuating said first switch element, and said second connecting rod is provided with at least one slope portion which is movable from one side to the other side of said latching member in accordance with the movement of said second connecting rod, for contacting with an edge of said latching member for displacing the same in order to release said latch projection from said edge of the latching member.

7. A switch assembly as set forth in claim 6, and further comprising means for preventing said first and second connecting rods from being pushed-in at the same time, said means for preventing comprising a pair of protrusions respectively provided on said first and second connecting rods, and a slidable member mounted between said first and second connecting rods.

8. A switch assembly as set forth in claim 1, wherein said first switching means comprises a first switch operating member pivotally mounted in a housing member having a movable switch contact on a side wall thereof, and pivotally movable between a normal position and a pressed-in position, and stationary contacts placed on a wall portion of said housing member at a position facing said movable contact when said first switch operating member is in said pressed-in position, and wherein said second switching means comprises a second switch operating member housed in said housing member, carrying a movable contact and movable between a normal position and a pressed-in position, and stationary contacts disposed in said housing member at a position facing said movable contact on said second switch operating member and contactable with said movable contact when said second switch operating member is in the pressed-in position, and said interrelating means comprises an arm portion formed on said first switch operating member and an edge portion formed on said second switch operating member so that said first switch operating member is released from said pressed-in position by a contact between an end of said arm portion of first switch operating member and said edge portion of said second switch operating member.

9. A switch assembly as set forth in claim 8, and further comprising a latching means for latching said first switch operating member in said pressed in position, comprising a ball and a spring received in a hollow space formed in a side wall of said first switch operating member and a recess formed on a wall portion of said housing at a position facing to said ball when said first switch operating member is in said pressed-in position.

10. A switch assembly as set forth in claim 1, wherein said first switching means comprises a first switch operating member pivotally mounted in a housing member, carrying a movable contact on a side wall thereof, and pivotally movable between a normal position and a pressed-in position, and a stationary contacts disposed on a wall portion of said housing member, at a position facing to said movable contact when said first switch operating member is in said pressed-in position, and said second switching means comprises a second switch operating member slidably received in said housing member, having a movable contact, and stationary contacts disposed on a wall portion of said housing member, and said interrelating means comprises a contacting end formed at an end portion of said first switch operating member and a slope portion formed at an end portion of said second switch operating member, and contactable with said contacting end of said first switch operating member when the latter is in the pressed-in position, so that the first switch operating member is moved back to the normal position in accordance with a slide movement of said second switch operating member.

11. A switch assembly as set forth in claim 10, further comprising a latching means for latching said first switch operating member in said pressed in position, comprising a ball and a spring received in a hollow space formed in a side wall of said first switch operating member and a recess formed on a wall portion of said housing at a position facing said ball when said first switch operating member is in said pressed-in position.

12. A switch assembly for a motor vehicle having a handle bar and a handle grip carried at an end of said handle bar, comprising:
an ignition circuit;
a starting motor circuit;
a housing mounted on said handle bar, adjacent to said handle grip;
a first switching means operatively connected to said ignition circuit for alternatively enabling and disabling an operation of said ignition circuit, said first switching means having a first switch operating knob; and
a second switching means operatively connected to said starting motor circuit for alternatively enabling and disabling an operation of said starting motor, said second switch means having a second switch operating knob, wherein said first and second switch operating members are housed in said housing in a manner that said first switch operating member is placed at a closer position to said handle grip than said second switch operating member;
said first and second switch operating knobs are arranged up and down in said housing relative to each other with the second switch knob being positioned below said first switch knob;
said first switch being operatively connected to a latch mechanism which is released when said second switch is operated.

13. A switch assembly as set forth in claim 12, wherein said first switch operating member is pivotally mounted on said housing so that a second end portion of a head portion of the first switch operating member projects from a surface of said housing in a position between a head portion of said second switch operating member and said handle grip when a first end portion of said head portion of the first switch operating member is pressed-in.

14. A switch assembly as set forth in claim 12, wherein said first switch operating member is slidably disposed in said housing and has a head portion with a protrusion, and the position of said first switch operating member is determined so that said protrusion is positioned between a head portion of said second switch operating member and said handle grip when said first switch operating member is slid to a position for an actuation of the first switching means.

* * * * *